US012670772B1

(12) United States Patent
Stucker

(10) Patent No.: US 12,670,772 B1
(45) Date of Patent: Jun. 30, 2026

(54) DAMAGE MINIMIZATION FOR AUTOMATED TELLER MACHINES

(71) Applicant: Wells Fargo Bank, N.A., San Francisco, CA (US)

(72) Inventor: Jeffrey Austin Stucker, Eagle, ID (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 19/070,700

(22) Filed: Mar. 5, 2025

(51) Int. Cl.
*G07F 19/00* (2006.01)

(52) U.S. Cl.
CPC .................................. *G07F 19/205* (2013.01)

(58) Field of Classification Search
CPC ...... G07F 19/20; G07F 19/201; G07F 19/205; G07F 19/207; G07F 9/001; G07F 19/203; G07F 7/06; G07F 7/005; G07F 17/10; G07F 9/026; G07F 7/088; G06Q 20/18; G06Q 20/1085; G06Q 20/20; G06Q 40/029; G06Q 30/0237; G06Q 20/202; G06Q 20/36
See application file for complete search history.

(56) References Cited

U.S. PATENT DOCUMENTS

2005/0224688 A1* 10/2005 Sommerville .......... G07F 19/20
52/27
2014/0054370 A1* 2/2014 Jenkins .............. G06Q 20/4012
235/379
2017/0074453 A1* 3/2017 Bowers ...................... E04H 1/14
2019/0203872 A1* 7/2019 Cifuentes Lopez .. G07F 19/205
2022/0237992 A1* 7/2022 Grant ...................... E01F 13/12

FOREIGN PATENT DOCUMENTS

EP 1624426 A1 * 2/2006 ............. G07F 19/20
JP 5699035 B2 * 4/2015

OTHER PUBLICATIONS

Design of Emotions context based Smart ATM Environment (Year: 2016).*
An IoT implementation to ATM safety system (Year: 2021).*

* cited by examiner

*Primary Examiner* — Thien T Mai
(74) *Attorney, Agent, or Firm* — Merchant & Gould P.C.

(57) ABSTRACT

An example system for minimizing damage to an automated teller machine can include: the automated teller machine; and a base supporting the automated teller machine, the base having a tipping mechanism configured to enable controlled movement of the automated teller machine; wherein the base is configured to be installed within an opening to allow the base of the automated teller machine to move relative to the opening to execute the controlled movement; and wherein the controlled movement is a tipping of the automated teller machine.

20 Claims, 5 Drawing Sheets

DAMAGE MINIMIZATION FOR AUTOMATED TELLER MACHINES

BACKGROUND

Automated teller machines (ATMs) are often vulnerable to theft attempts, where criminals try to forcibly remove the ATMs. This can result in extensive structural damage to the ATMs that require lengthy and costly repairs. The time and cost associated with replacing or repairing severely damaged ATMs, particularly when structural damage occurs, represents a significant operational challenge for financial institutions.

SUMMARY

Examples provided herein are directed to the minimization of damage to ATMs.

According to one aspect, an example system for minimizing damage to an automated teller machine can include: the automated teller machine; and a base supporting the automated teller machine, the base having a tipping mechanism configured to enable controlled movement of the automated teller machine; wherein the base is configured to be installed within an opening to allow the base of the automated teller machine to move relative to the opening to execute the controlled movement; and wherein the controlled movement is a tipping of the automated teller machine.

According to another aspect, an example method for minimizing damage to an automated teller machine can include: providing the automated teller machine; supporting the automated teller machine with a base, the base having a tipping mechanism configured to enable controlled movement of the automated teller machine; and installing the base within an opening to allow the base of the automated teller machine to move relative to the opening to execute the controlled movement, wherein the controlled movement is a tipping of the automated teller machine.

The details of one or more techniques are set forth in the accompanying drawings and the description below. Other features, objects, and advantages of these techniques will be apparent from the description, drawings, and claims.

DETAILED DESCRIPTION

This disclosure relates to the minimization of damage to ATMs.

More specifically, aspects described herein are directed to minimize damage from ATM theft attempts by allowing the ATM to tip over rather than be forcibly removed. The design can incorporate an ATM embedded in a foundational base with a tipping mechanism. When thieves attempt to steal the ATM, the tipping mechanism causes the chain to likely slip off, resulting in the ATM tipping over rather than being pulled away from the foundational base.

Aspects of this disclosure can therefore include a tipping mechanism that allows the ATM to tip over instead of being forcibly removed during theft attempts, minimizing structural damage. In other aspects, design elements of the ATMs can be configured to minimize solid grab points for chains, making it harder for thieves to successfully attach and pull the ATMs. In some embodiments, bollards can be integrated into the ATMs to absorb stress and provide leverage for tipping.

Further, a foundation design can enable controlled tipping, featuring one or more of a strong pivot rod for single-direction tipping, or a half-sphere base design for multi-directional movement. This can allow for the ability to be reset to an upright position after a tipping incident, without necessarily requiring structural repairs or new concrete pouring. This can be accomplished using a base design that is sized to be too massive to be moved but can slide within a matching hole during the tipping action.

In these examples, the base would be sufficiently heavy to enable the controlled tipping motion while preventing forcible removal. This could require that the base to weigh at least several thousand pounds. The concrete could be reinforced with steel rebar and potentially incorporate additional dense materials to achieve the necessary mass while maintaining structural integrity during tipping events.

This thereby minimizes the need for re-pouring concrete and associated permitting after an attempted theft. This approach can allow for quicker restoration, since the ATM can simply be reset to an upright position and repaired, avoiding the lengthy delays associated with concrete re-pouring and permitting requirements. Many other advantages are provided herein.

The disclosure provides a practical solution to the significant technical problem associated with physical damage prevention systems for ATMs that reduces both repair costs and service interruptions. This practical implementation results in a tangible improvement in ATM security and serviceability, as the tipped ATM can be quickly restored to service by resetting its position and performing minor repairs, eliminating the need for extensive structural work, concrete re-pouring, or permitting processes that typically cause extended service interruptions.

Figure 1:
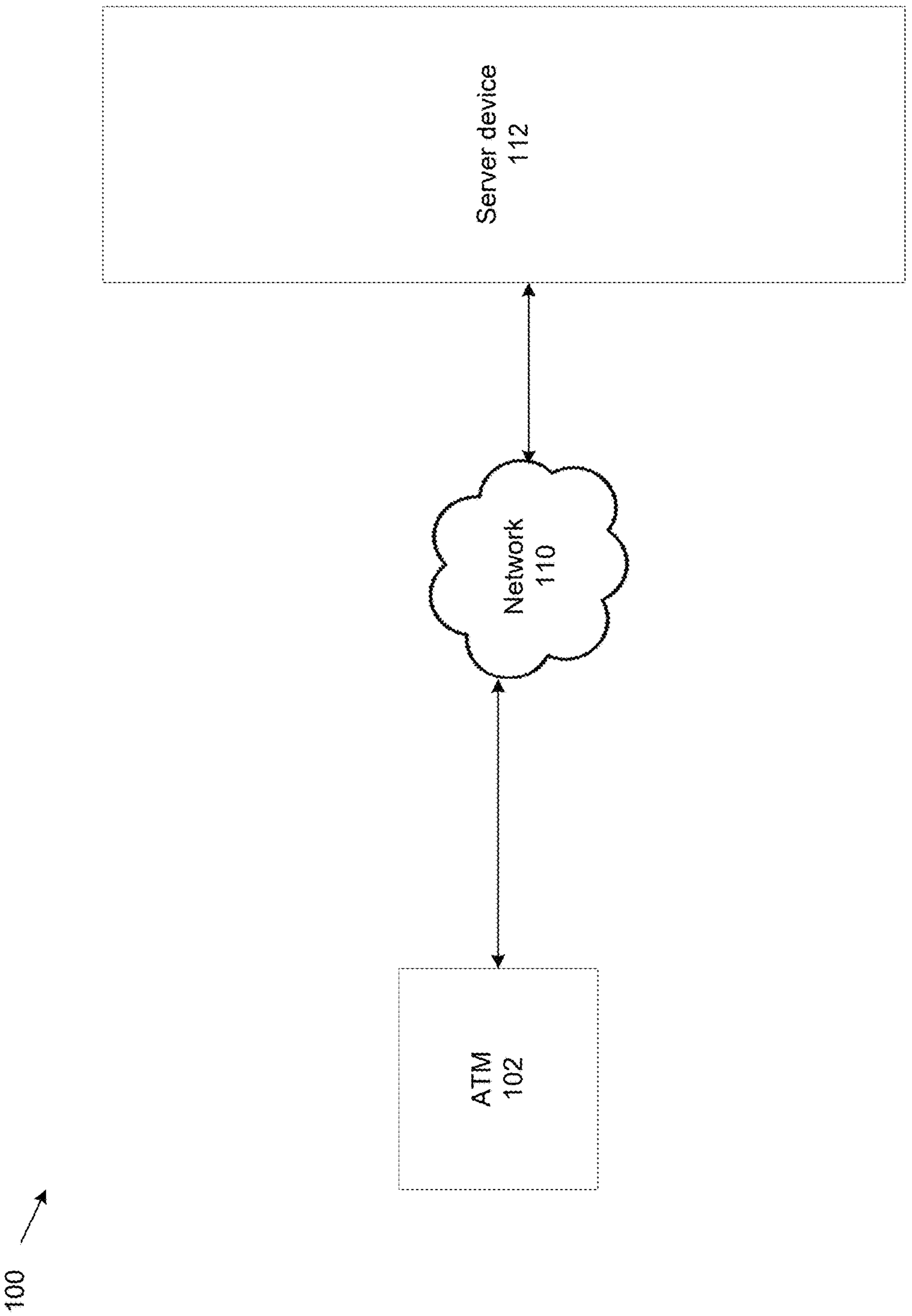
FIG. 1 shows an example system for the minimization of damage to ATMs.

FIG. 1 schematically shows aspects of one example system 100 configured to minimize damage to ATMs. In this example, the system 100 can include an ATM 102 connected to a server device 112. The ATM 102 can communicate with the server device 112 through a network 110 to accomplish the functionality described herein.

Each of the devices of the system 100 may be implemented as one or more computing devices with at least one processor and memory. Example computing devices include a mobile computer, a desktop computer, a server computer, or other computing device or devices such as a server farm or cloud computing used to generate or receive data. Example components of such computing devices are described herein (see FIG. 5).

In some non-limiting examples, the ATM 102 and/or the server device 112 is owned by a financial institution, such as a bank. Many other configurations are possible.

The example ATM 102 is a self-service banking terminal that allows users to perform various financial transactions without the need for a bank teller. The general components of the ATM 102 can typically include a user interface, a card reader, a keypad, a cash dispenser, a receipt printer, and a network connection.

When a user inserts a bank card into the card reader and enters a personal identification number (PIN) on the keypad, the ATM 102 establishes a secure connection with the server device 112 through the network 110. This connection allows the ATM 102 to access the user's account information on the server device 112 and provide a range of services, such as cash withdrawals, balance inquiries, fund transfers, and bill payments.

The user interacts with the ATM 102 through the user interface, which displays relevant options and instructions. Once the transaction is completed, the ATM 102 can dispense the requested amount of cash (or other requested product(s)), print a receipt (if requested), and/or update the user's account balance. Overall, the ATM 102 provides a convenient and efficient way for users to manage their banking needs on the go.

In view of this functionality, the ATM 102 is typically located in a public space that may be accessible for a large portion or all times of a day. Given this location and access, the ATM 102 can be vulnerable to damage or theft, as provided further herein.

The network 110 provides a wired and/or wireless connection between the ATM 102 and the server device 112. In some examples, the network 110 can be a local area network, a wide area network, the Internet, or a mixture thereof. Many different communication protocols can be used. Although only two devices are shown, the system 100 can accommodate hundreds, thousands, or more of ATMs and other computing devices.

Figure 2:
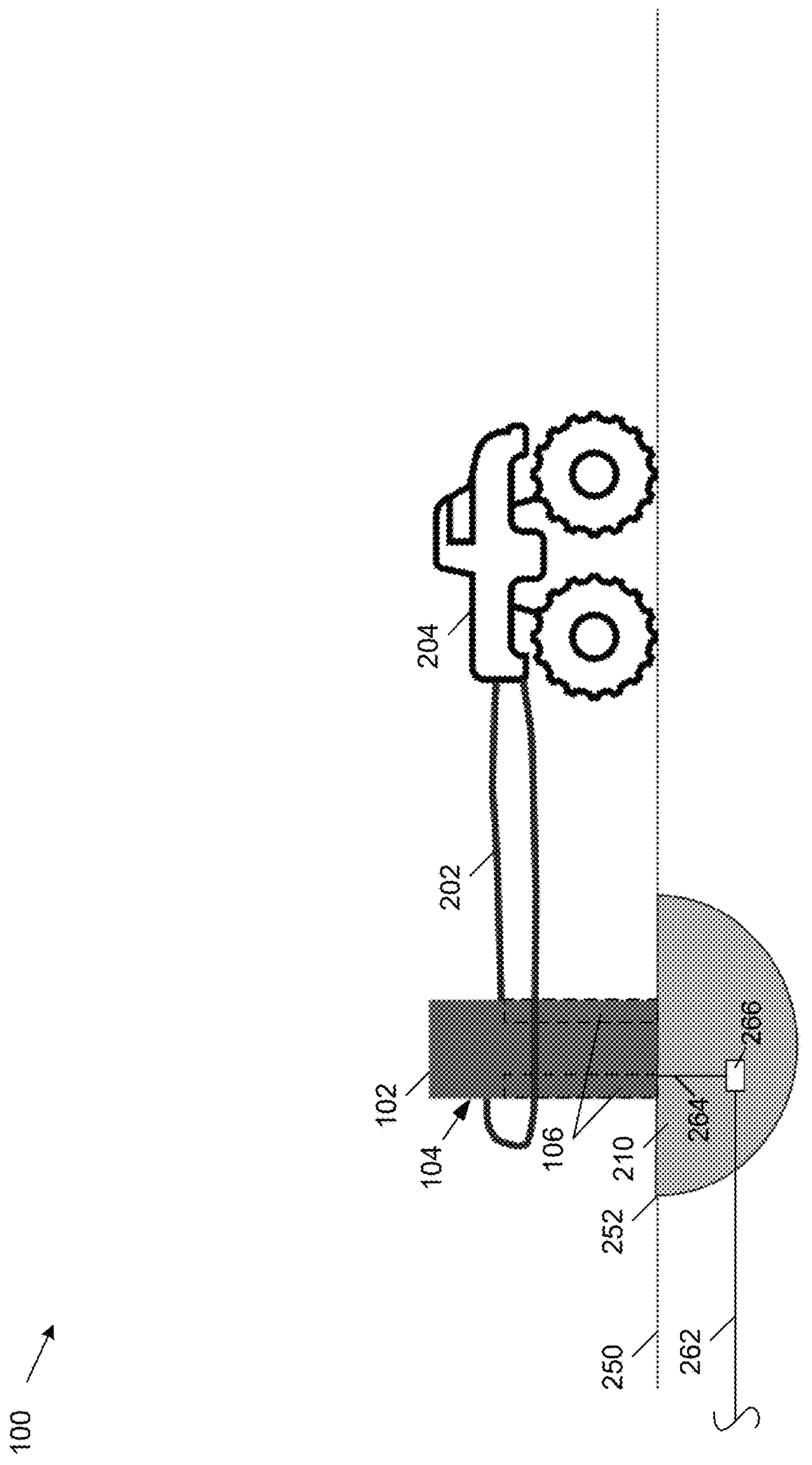
FIG. 2 shows additional details of the system of FIG. 1.
Figure 3:
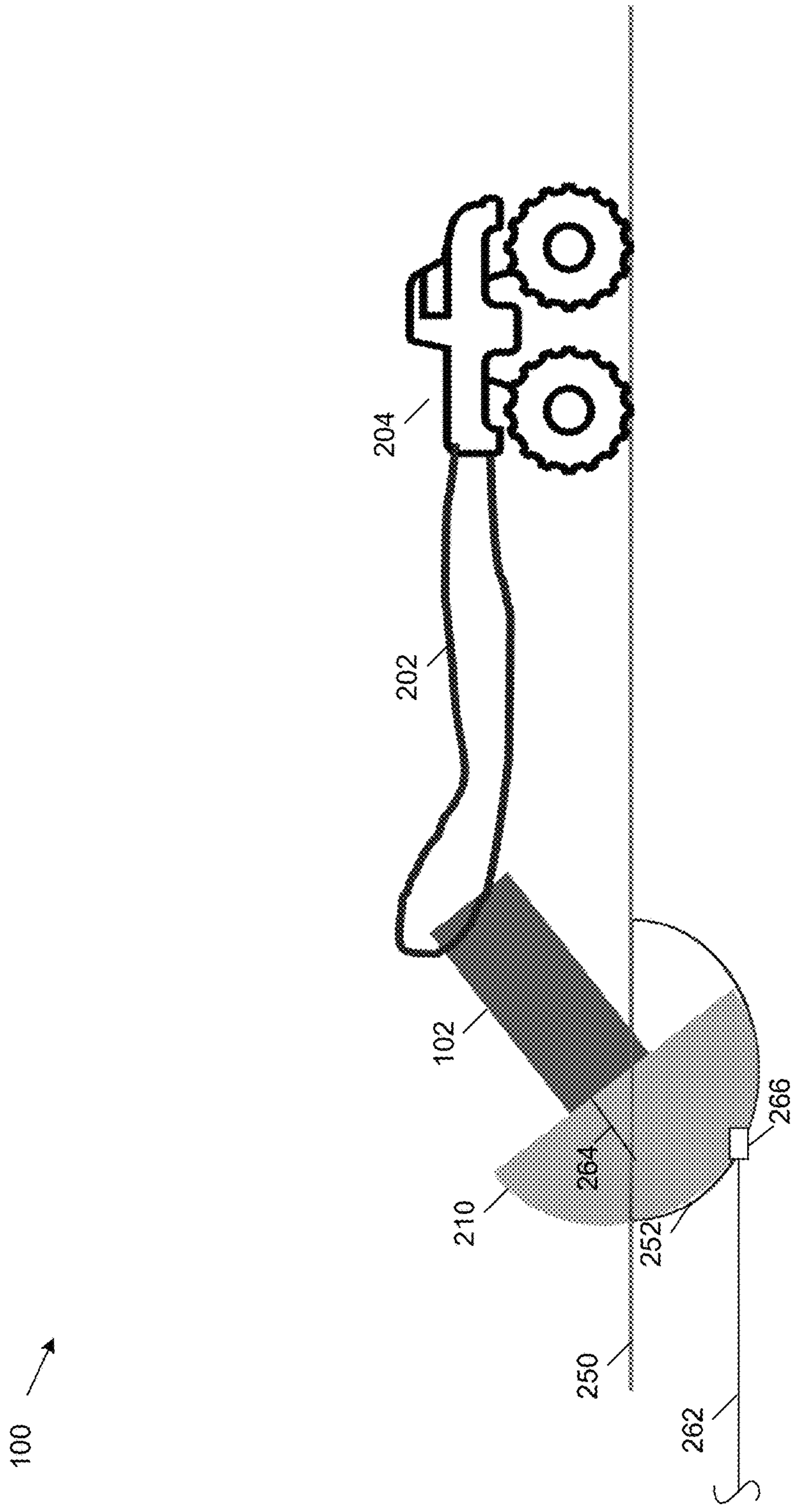
FIG. 3 shows another view of the system of FIG. 2.

Referring now to FIGS. 2 and 3, additional details of the system 100 are shown. In this example, the ATM 102 is strategically positioned above a base 210 that is securely installed within a precisely dimensioned hole 252 in the ground 250. The base 210 can feature either a pivot rod mechanism for controlled single-direction tipping movement, or alternatively, a half-sphere configuration that enables multi-directional tipping capability, depending on the specific installation requirements and anticipated threat vectors.

The base 210 is configured with specific mass calculations to prevent unauthorized removal while maintaining the capability for controlled movement within the matching hole 252 during authorized tipping events. For example, the base 210 can be created through a specialized concrete pouring process that incorporates multiple stages, with a first pour creating a matching nest or hole followed by a separate foundation pour, creating intentional seams between the poured sections to facilitate the tipping movement.

The surface of the base 210 can be configured to be smooth between the foundation and embedded material to facilitate the controlled tipping movement. The concrete pour can also account for the installation of necessary connections (e.g., network connections) that will interface with the ATM 102. The base 210 can, as described herein, minimize the need for re-pouring concrete after a tipping incident, as the structure maintains its integrity within the hole 252 and can be reset to its original position.

The ATM 102 is also equipped with network connections, including a financial institution connection 262 and an ATM connection 264. These connections 262, 264 are integrated into a breakaway wiring harness 266 that facilitates clean separation during tipping events while maintaining system integrity. The breakaway wiring harness 266 is specifically designed to disconnect in a controlled manner when the ATM 102 experiences a tipping event, thereby preventing damage to critical electronic and communication components.

More specifically, the breakaway wiring harness 266 is designed to allow clean separation during tipping events while maintaining the integrity of the system 100. The wiring harness includes both the financial institution connection 262 and ATM connection 264, which are specifically engineered to disconnect in a controlled manner when the ATM experiences a tipping event.

The breakaway wiring harness 266 could be implemented using quick-disconnect connectors for both the financial institution connection 262 and ATM connection 264 that are designed to separate at a predetermined force threshold during tipping events. The connections could be arranged in a modular configuration that allows the wiring to naturally disconnect when the ATM 102 tips, while maintaining the structural integrity of the connectors themselves. The harness assembly could incorporate strain relief mechanisms and protective housings that guide the separation along predetermined break points, ensuring that when the ATM 102 tips, the electrical and data connections separate cleanly without causing damage to the internal wiring or connection points. After a tipping incident, these modular connections would allow maintenance personnel to simply realign and reconnect the separated components, with the quick-disconnect features facilitating rapid restoration of all necessary electrical and communication links.

This design can minimize damage to critical electronic and communication components during forced tipping and allows for quick reestablishment of all necessary connections when restoring the ATM 102 to service. The breakaway wiring harness 266 can be configured to be easily reattached after a tipping incident, facilitating rapid restoration of ATM functionality without requiring extensive repairs.

An external structure 104 of the ATM 102 features smooth surfaces that minimize potential attachment points (e.g., where a chain 202 might gain purchase) during theft attempts. For instance, the external structure 104 of the ATM 102 can employ specialized design elements to prevent chain-based theft attempts through the elimination of potential attachment points. The external structure 104 can incorporate smooth, rounded corners and edges rather than sharp angles, with any corners being purely cosmetic elements designed to break away without compromising the structural integrity of the ATM 102, while the main body features smooth, continuous surfaces without protrusions, ledges, or recessed areas that could provide chain anchor points.

The material composition of the external structure 104 can include an outer breakaway skin system with panels engineered to separate cleanly during theft attempts, combined with slick, low-friction exterior coating materials that reduce chain grip capability. These cosmetic exterior elements are specifically designed for easy replacement following tipping incidents, minimizing repair time and costs. All necessary access points, including the customer interface, are seamlessly integrated to maintain the smooth surface profile while ensuring normal operational functionality, with aesthetic integration of security features creating a cohesive design that causes chains to slip off rather than gain purchase during theft attempts. Many other configurations are possible.

The ATM 102 can also optionally include one or more example bollards 106 that serve multiple purposes, including to provide essential protective strength and functioning as engineered leverage points that facilitate the controlled tipping motion of the ATM 102.

For example, such integrated bollards 106 can be designed to be embedded deeply into the ATM structure, serving both as protective elements and leveraging points for the controlled tipping motion. Rather than being mounted externally as traditional bollards, these protective elements are incorporated directly into the ATM's construction, creating a seamless integration that maintains the device's aesthetic appearance while providing robust security features.

The bollards 106 can be integrated into the corners of the ATM 102 or aesthetically built into the structure itself, with the strength of the bollards engineered to absorb stress during attempted thefts while simultaneously providing leverage points that facilitate the controlled tipping motion. The integration extends deep into the device's structure, ensuring the bollards maintain their protective capability while eliminating potential attachment points that could be exploited during theft attempts.

The construction method involves embedding the bollards 106 during the manufacturing process, ensuring they become an integral part of the ATM's structural framework rather than add-on security features. This integration creates a unified protective system where the bollards work in concert with the smooth exterior surfaces and breakaway skin panels, allowing the entire structure to respond cohesively during attempted thefts. The bollards' placement and integration are specifically engineered to direct forces during a theft attempt in a way that promotes the desired tipping motion while preventing structural damage to the ATM's core components.

The system 100 that includes the integrated bollard(s) 106 is designed to maintain its structural integrity even when the ATM 102 experiences a tipping event, ensuring that the protective elements remain functional after the ATM 102 is reset to its upright position. This design approach eliminates the need for bollard replacement or repair after tipping incidents, contributing to the system's goal of rapid restoration to service without requiring extensive structural repairs.

Referring now to FIG. 3, when criminals attempt to forcibly remove the ATM 102 using a vehicle 204 and the chain 202, rather than resisting the pulling force with rigid opposition, the ATM 102 executes a controlled tipping movement about the pivot rod mechanism that causes the chain 202 to lose its grip, thereby preventing catastrophic structural damage to both the ATM 102 and its base 210, as shown in FIG. 3. The base 210 can rotate and maintain its position within the hole 252 throughout this event, preserving the structural integrity of the installation.

Alternatively, the base 210 can be designed with a half-sphere configuration that enables multi-directional tipping movement within the hole 252. This design incorporates a smooth surface between the foundation and embedded material, allowing the massive concrete base to slide within the matching hole while maintaining its position. The concrete is specifically engineered to be heavy enough to prevent complete removal while still enabling this controlled sliding movement.

The rotation mechanism relies on intentionally created seams between separately poured concrete sections, with a first pour creating a matching nest followed by a separate foundation pour. This design creates predetermined break points that facilitate the controlled tipping motion while maintaining the structural integrity of the installation. During a theft attempt, when force is applied via a vehicle 204 and chain 202, the rotation of the base 210 within the hole 252 allows the ATM 102 to execute a controlled tipping movement rather than being forcibly removed.

Following a tipping incident, the ATM 102 can be efficiently restored to operational status through a series of predetermined steps. This restoration process includes resetting the ATM 102 to its upright position within the hole 252, reconnecting all separated connections 262, 264, 266, and addressing any cosmetic damage.

More specifically, the process of resetting the ATM 102 after a tipping event involves several carefully engineered steps designed to minimize downtime and restoration costs. The ATM 102 can be efficiently restored to its upright position through a predetermined reset and slide-back process within the hole 252, taking advantage of either the pivot rod mechanism or half-sphere base configuration that facilitated the initial controlled tipping.

Once the ATM 102 is repositioned, the breakaway wiring harness system 266 allows for quick reestablishment of all necessary connections. The financial institution connection 262, ATM connection 264, and the breakaway wiring harness system 266 can be designed with quick-disconnect features that enable clean separation during tipping events and facilitate rapid reconnection during restoration. The modular nature of these connections allows maintenance personnel to simply realign and reconnect the separated components without requiring extensive repairs to the wiring system.

The final phase involves addressing cosmetic damage to the exterior of the ATM 102. The external structure 104 can comprise a skin with multiple panels that are specifically designed to be easily replaceable after tipping incidents, allowing for quick restoration of the appearance of the ATM 102. This design approach ensures that any damage is limited to cosmetic elements rather than affecting the core structural components, with repair costs typically remaining much lower than the restoration of traditional ATM installations.

The entire reset process is engineered to avoid the need for structural repairs, concrete re-pouring, or permitting requirements that typically cause extended service interruptions. This efficient restoration process enables the ATM to return to service quickly, significantly reducing both operational downtime and associated repair costs compared to traditional ATM installations that suffer structural damage during theft attempts.

The design minimizes the need for extensive structural repairs or concrete replacement, significantly reducing both restoration time and associated costs. The breakaway wiring harness system allows for quick reestablishment of all necessary connections 266, including both the financial institution connection 262 and ATM connection 264, enabling rapid return to service.

The system 100 is designed to work in concert, with each component, from the ATM 102 to the base 210 and the connections 262, 264, 266, functioning as part of an integrated damage prevention solution that prioritizes both security and serviceability. The installation within the ground 250 via the hole 252 enhances stability during normal operation while facilitating the controlled tipping response during attempted theft using a vehicle 204 and chain 202.

Figure 4:
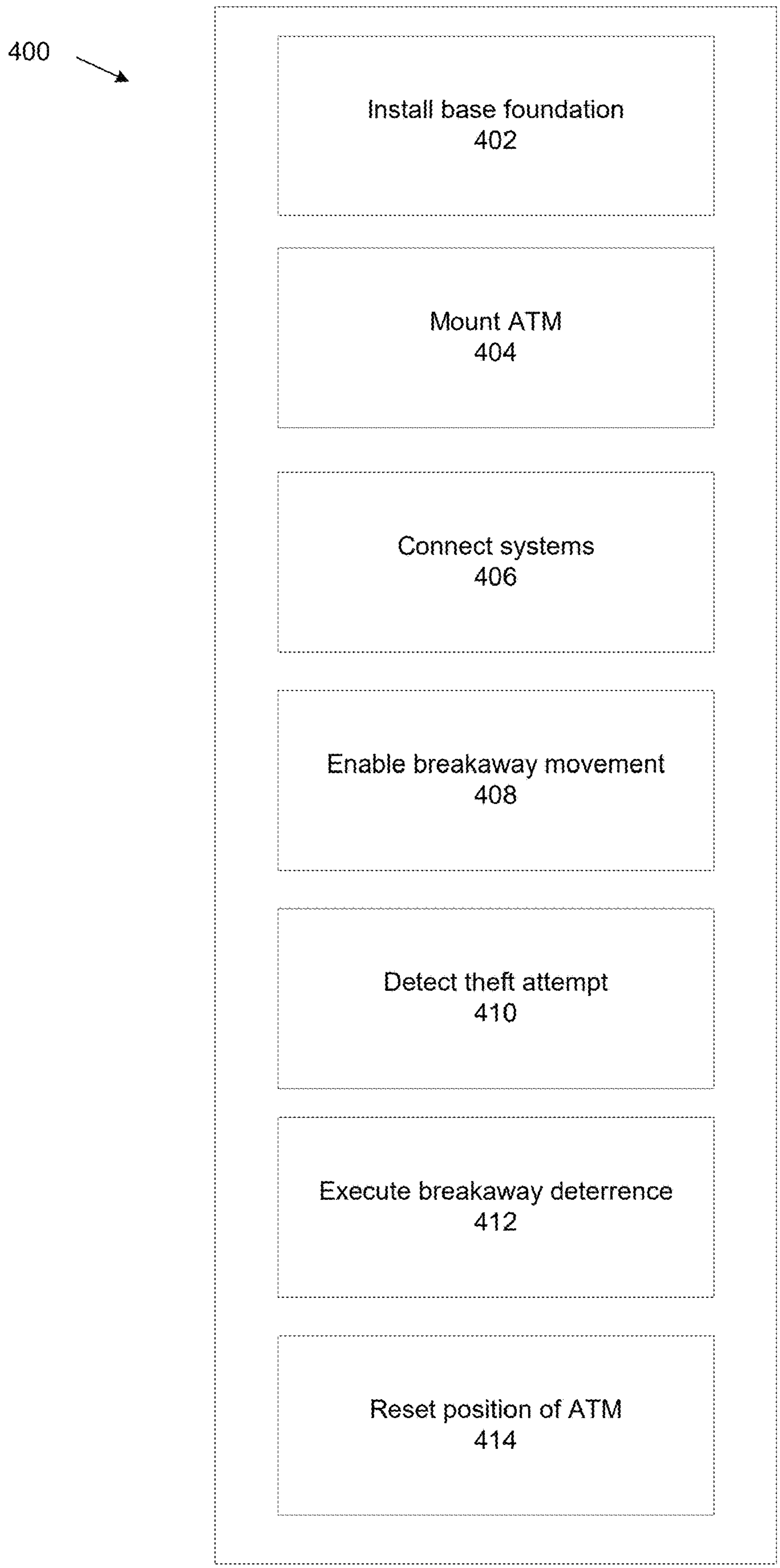
FIG. 4 shows an example method for minimizing damage to ATMs as implemented by the system of FIG. 1.

FIG. 4 illustrates a method 400 for implementing and utilizing the system 100 for ATMs. The example method 400 can comprise the following steps.

First, the method 400 begins with installing the base foundation (step 402), which involves creating and positioning the base 210 within a precisely dimensioned hole 252 in the ground 250. This foundation includes either the pivot rod mechanism or half-sphere configuration to enable controlled tipping motion.

The second step involves mounting the ATM (step 404), where the ATM 102 is carefully positioned and secured to the base 210. During this step, the installation ensures proper integration of protective features, including the smooth surfaces and integrated bollards designed to prevent successful chain attachment during theft attempts.

In the third step, connecting systems (step 406), all necessary connections are established, including the financial institution connection 262, ATM connection 264, and other related connections 266. These connections are specifically designed with breakaway capabilities to facilitate clean separation during tipping events.

The fourth step involves enabling breakaway movement (step 408), which includes verifying and activating the tipping mechanism's functionality. As described herein, the breakaway movement for the ATM 102 may be done actively or passively. Passive breakaway mechanisms would be inherent to the physical characteristics of the installation. Active breakaway mechanisms may be supported by hydraulics or other mechanisms to provide an easier reset to upright position. This ensures the system is properly configured to execute controlled tipping motion when subjected to forcible removal attempts.

The fifth step, detecting theft attempt (step 410), represents the system's passive readiness to respond when criminals attempt to remove the ATM. As noted above, one example of such an attempt could be using a vehicle 204 and chain 202.

In the sixth step, executing breakaway deterrence (step 412), the system responds to the theft attempt by allowing the ATM 102 to tip in a controlled manner (passively and/or actively, as described herein) while maintaining the integrity of the base 210 within the hole 252.

The final step involves resetting the position of the ATM (step 414), where maintenance personnel can restore the ATM 102 to its upright position (passively and/or actively), reconnect all breakaway connections 262, 264, 266, and perform any necessary cosmetic repairs without requiring structural reconstruction or new concrete pouring.

Many alternative configurations for the system 100 are possible.

For instance, the tipping mechanism could utilize alternative designs beyond the disclosed pivot rod or half-sphere configurations. For example, the system could incorporate a rounded rectangular base that enables controlled tipping primarily in two directions or employ a series of rollers or bearings to facilitate movement rather than relying on sliding friction. Multiple pivot points could also be implemented instead of a single pivot rod to provide more precise control over the tipping motion.

The structural design could be modified to use different protective elements and surface treatments. Rather than permanently integrated bollards, the system could incorporate retractable protective elements that extend during normal operation but retract during tipping events. The exterior could be redesigned with specially engineered breakaway panels that fragment upon chain attachment instead of using smooth surfaces. Additionally, the base could utilize lightweight but high-strength materials combined with strategic counterweights, moving away from the traditional concrete mass approach.

The connection system could be redesigned to reduce physical connection points. Instead of using a breakaway wiring harness, the system could implement wireless connections for non-critical functions while maintaining only essential hardwired connections. Alternatively, the wiring system could incorporate an automatic retraction mechanism that actively pulls connections away during tipping events rather than relying on passive breakaway points.

The base could be reconfigured to accommodate different installation scenarios. Rather than requiring in-ground installation, the system could utilize an above-ground foundation with a larger footprint that enables controlled tipping while maintaining stability. The base structure could incorporate shock-absorbing materials or mechanisms instead of relying solely on concrete construction. The foundation could also be constructed using pre-fabricated sections assembled on-site, eliminating the need for multiple concrete pours while still creating the necessary movement interfaces.

The reset functionality could be enhanced with automated features. The system could incorporate hydraulic or mechanical assist mechanisms to aid in returning the ATM to its upright position, reducing the manual effort required for restoration. More advanced implementations could include automated leveling mechanisms that engage after tipping events, ensuring proper repositioning without requiring extensive manual intervention.

Figure 5:
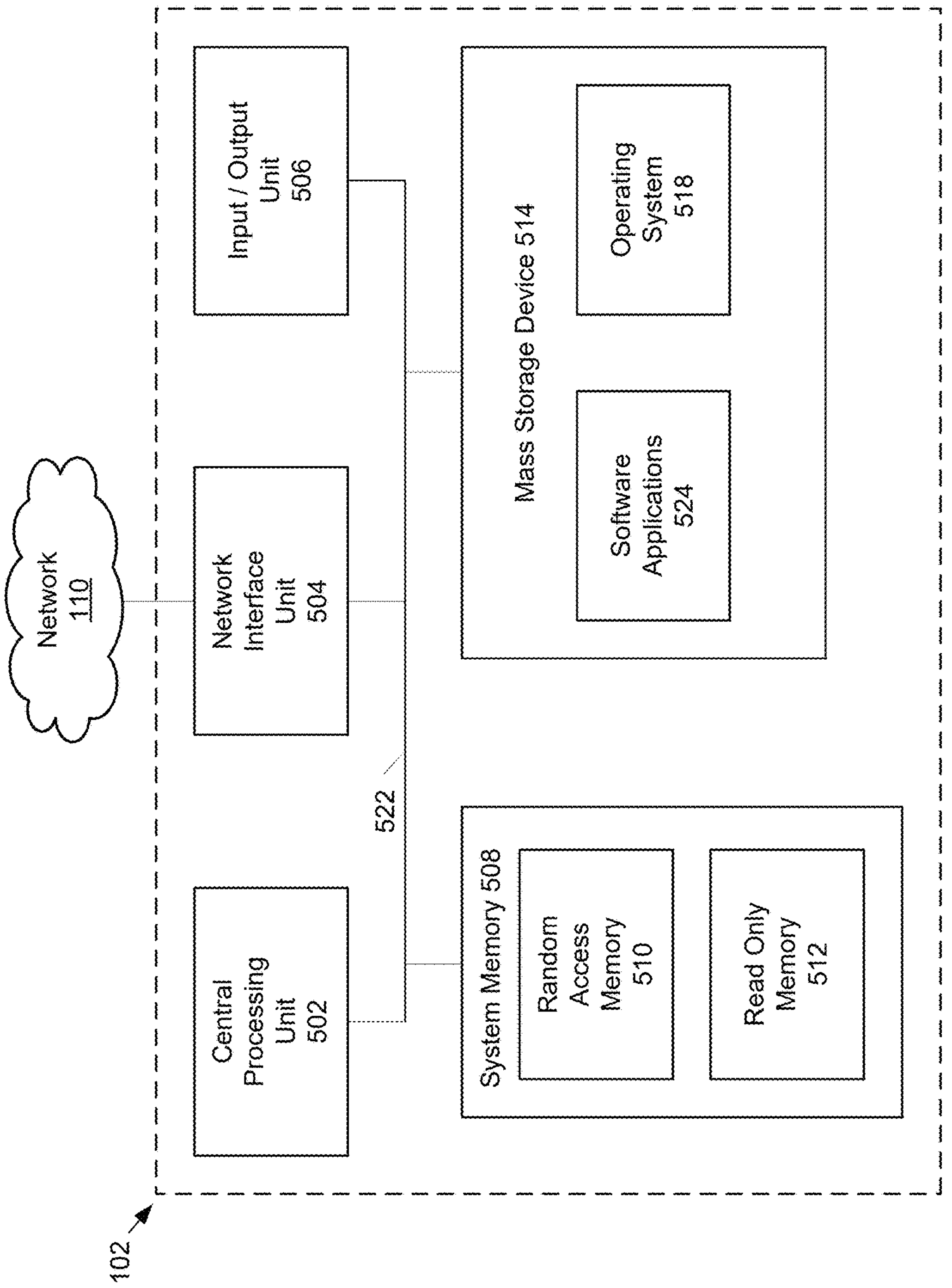
FIG. 5 shows example physical components of the ATM of FIG. 2.

As illustrated in the embodiment of FIG. 5, the example ATM 102, which provides the functionality described herein, can include at least one central processing unit ("CPU") 502, a system memory 508, and a system bus 522 that couples the system memory 508 to the CPU 502. The system memory 508 includes a random access memory ("RAM") 510 and a read-only memory ("ROM") 512. A basic input/output system containing the basic routines that help transfer information between elements within the ATM 102, such as during startup, is stored in the ROM 512. The ATM 102 further includes a mass storage device 514. The mass storage device 514 can store software instructions and data. A central processing unit, system memory, and mass storage device similar to that shown can also be included in the other computing devices disclosed herein.

The mass storage device 514 is connected to the CPU 502 through a mass storage controller (not shown) connected to the system bus 522. The mass storage device 514 and its associated computer-readable data storage media provide non-volatile, non-transitory storage for the ATM 102. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and that can be accessed by the ATM 102.

According to various embodiments of the invention, the ATM 102 may operate in a networked environment using logical connections to remote network devices through network 110, such as a wireless network, the Internet, or another type of network. The ATM 102 may connect to network 110 through a network interface unit 504 connected to the system bus 522. It should be appreciated that the network interface unit 504 may also be utilized to connect to other types of networks and remote computing systems. The ATM 102 also includes an input/output controller 506 for receiving and processing input from a number of other devices, including a touch user interface display screen or another type of input device. Similarly, the input/output controller 506 may provide output to a touch user interface display screen or other output devices.

As mentioned briefly above, the mass storage device 514 and the RAM 510 of the ATM 102 can store software instructions and data. The software instructions include an operating system 518 suitable for controlling the operation of the ATM 102. The mass storage device 514 and/or the RAM 510 also store software instructions and applications 524, that when executed by the CPU 502, cause the ATM 102 to provide the functionality of the ATM 102 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for minimizing damage to an automated teller machine, comprising:
- the automated teller machine; and
- a base supporting the automated teller machine, the base having a tipping mechanism configured to enable controlled movement of the automated teller machine;
- wherein the base is configured to be installed within an opening to allow the base of the automated teller machine to move relative to the opening to execute the controlled movement; and
- wherein the controlled movement is a tipping of the automated teller machine.

2. The system of claim 1, wherein the tipping mechanism comprises a pivot rod mechanism configured to enable a single-direction tipping movement of the automated teller machine.

3. The system of claim 1, wherein the tipping mechanism comprises a half-sphere configuration configured to enable a multi-directional tipping movement of the automated teller machine.

4. The system of claim 1, wherein the base comprises concrete and is sufficiently massive to prevent removal while enabling a sliding movement within the opening during the controlled movement.

5. The system of claim 1, wherein the automated teller machine comprises smooth exterior surfaces configured to minimize attachment points.

6. The system of claim 1, wherein the automated teller machine comprises an integrated bollard configured to provide protective strength and function as leverage points for the controlled movement.

7. The system of claim 1, further comprising a breakaway wiring harness including:
- a financial institution connection; and
- an ATM connection;
- wherein the breakaway wiring harness is configured to disconnect during the controlled movement and enable reconnection after restoration to an upright position.

8. The system of claim 1, wherein the base comprises separately poured concrete sections creating predetermined break points to facilitate the controlled movement.

9. The system of claim 1, wherein the automated teller machine comprises an outer breakaway skin configured to separate during the controlled movement.

10. The system of claim 1, wherein the base is configured to maintain structural integrity within the opening during the controlled movement to enable restoration of the automated teller machine to an upright position.

11. A method for minimizing damage to an automated teller machine, comprising:
- providing the automated teller machine;
- supporting the automated teller machine with a base, the base having a tipping mechanism configured to enable controlled movement of the automated teller machine; and
- installing the base within an opening to allow the base of the automated teller machine to move relative to the opening to execute the controlled movement, wherein the controlled movement is a tipping of the automated teller machine.

12. The method of claim 11, wherein the tipping mechanism comprises a pivot rod mechanism configured to enable a single-direction tipping movement of the automated teller machine.

13. The method of claim 11, wherein the tipping mechanism comprises a half-sphere configuration configured to enable a multi-directional tipping movement of the automated teller machine.

14. The method of claim 11, wherein the base comprises concrete and is sufficiently massive to prevent removal while enabling a sliding movement within the opening during the controlled movement.

15. The method of claim 11, wherein the automated teller machine comprises smooth exterior surfaces configured to minimize attachment points.

16. The method of claim 11, wherein the automated teller machine comprises an integrated bollard configured to provide protective strength and function as leverage points for the controlled movement.

17. The method of claim 11, further comprising a breakaway wiring harness including:
- a financial institution connection; and
- an ATM connection;
- wherein the breakaway wiring harness is configured to disconnect during the controlled movement and enable reconnection after restoration to an upright position.

18. The method of claim 11, wherein the base comprises separately poured concrete sections creating predetermined break points to facilitate the controlled movement.

19. The method of claim 11, wherein the automated teller machine comprises an outer breakaway skin configured to separate during the controlled movement.

20. The method of claim 11, wherein the base is configured to maintain structural integrity within the opening during the controlled movement to enable restoration of the automated teller machine to an upright position.

* * * * *